Figure 1:
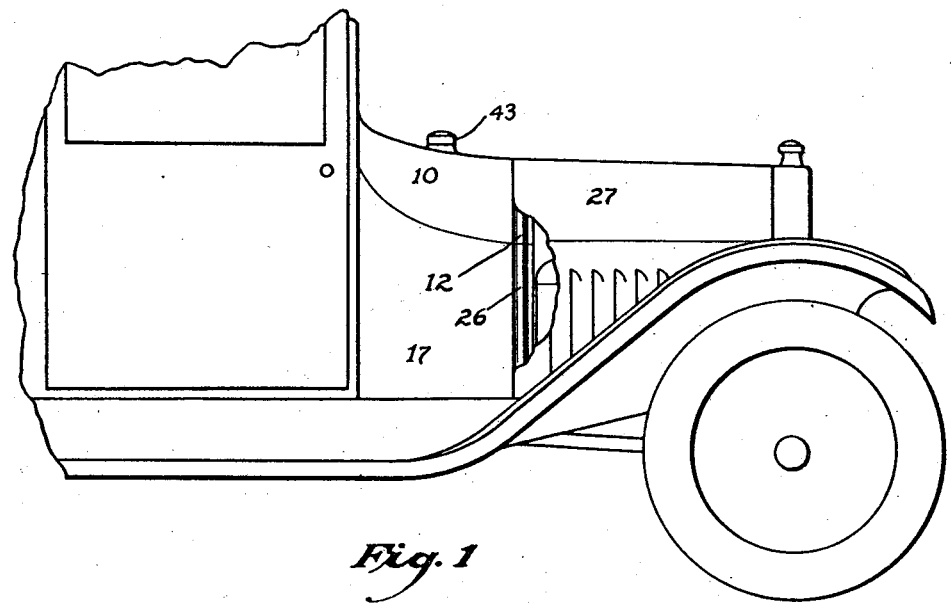
Figure 2:
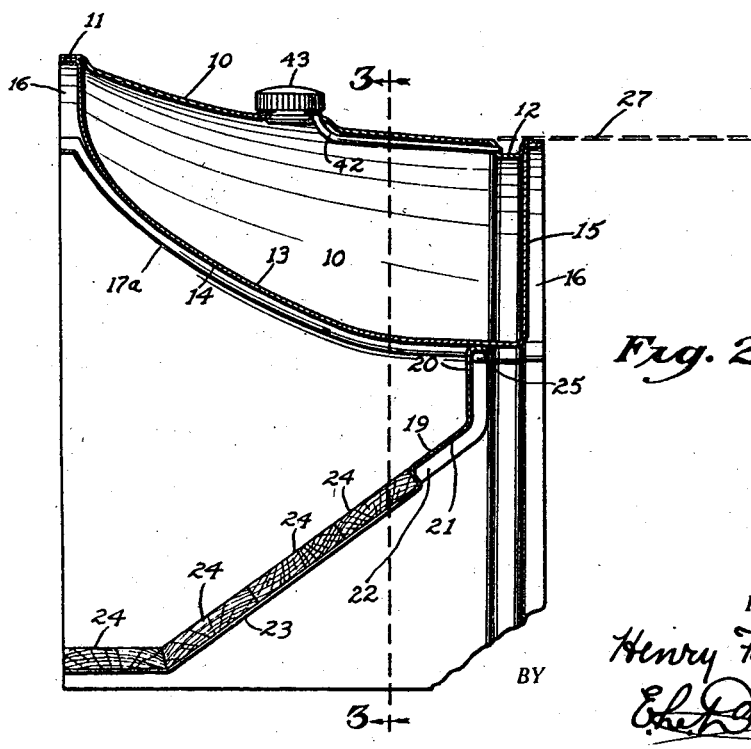
Figure 3:
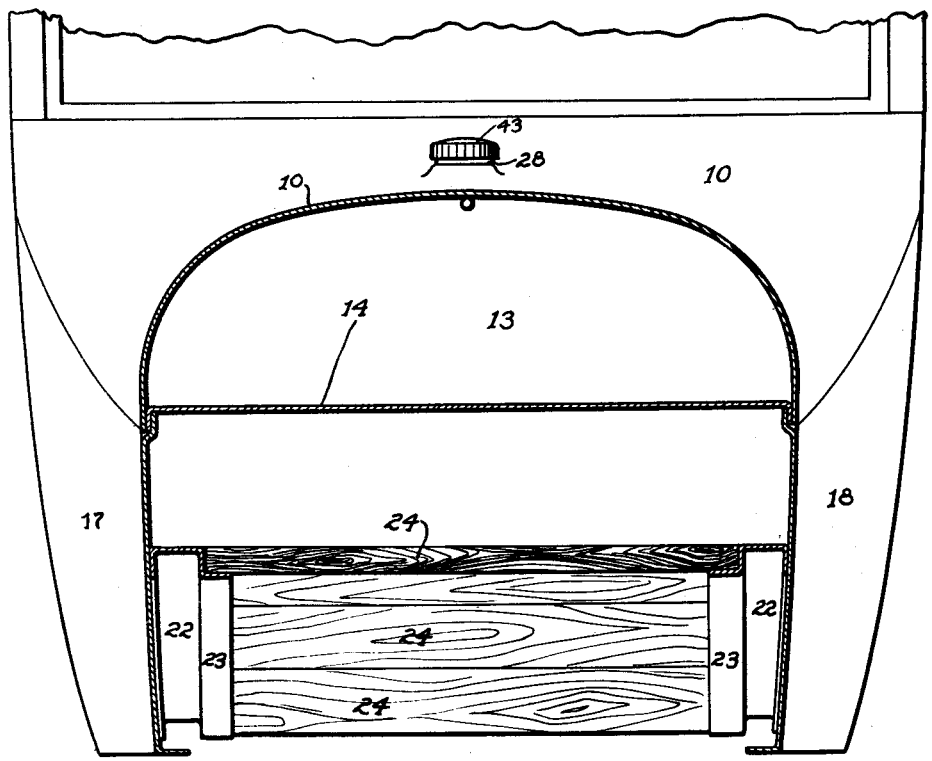
Figure 4:
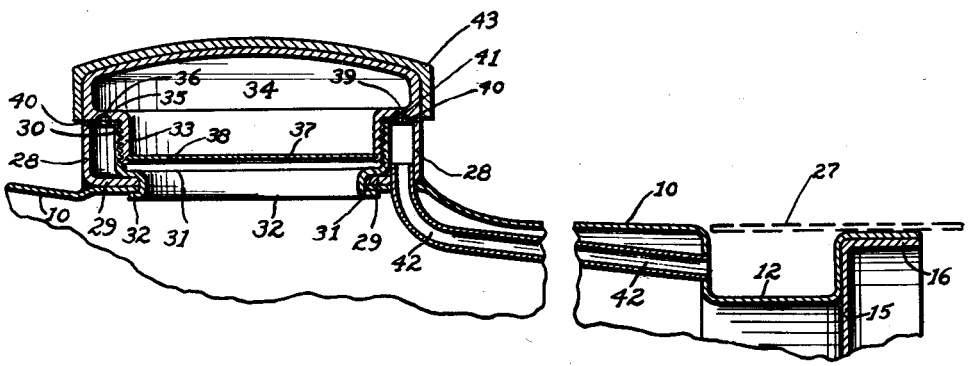
Figure 5:
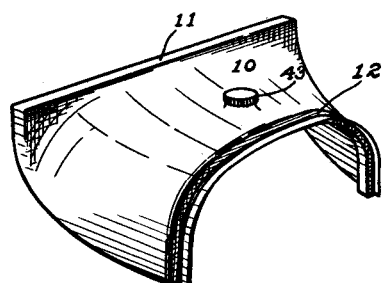
Figure 6:
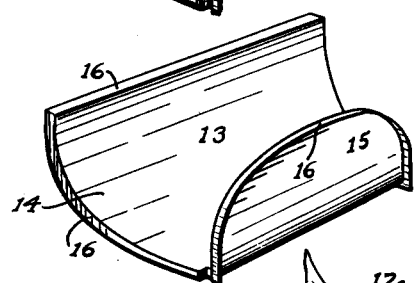
Figures 7, 8:
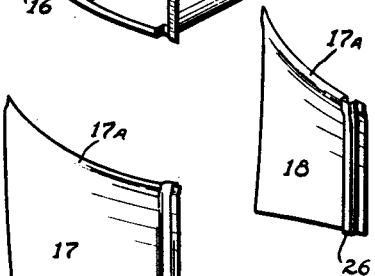
Figure 9:
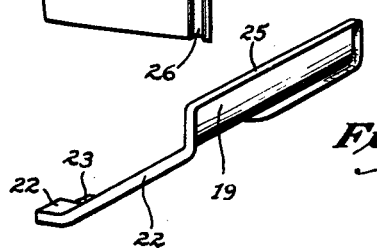

May 24, 1927.

H. FORD

AUTOMOBILE BODY CONSTRUCTION

Filed Aug. 18, 1926

1,629,493

3 Sheets-Sheet 1

INVENTOR.
Henry Ford
BY
ATTORNEY.

May 24, 1927.

H. FORD 1,629,493

AUTOMOBILE BODY CONSTRUCTION

Filed Aug. 18, 1926   3 Sheets-Sheet 2

INVENTOR.
BY Henry Ford.
ATTORNEY.

May 24, 1927. 1,629,493
H. FORD
AUTOMOBILE BODY CONSTRUCTION
Filed Aug. 18, 1926   3 Sheets-Sheet 3

INVENTOR.
Henry Ford,
BY
ATTORNEY.

Patented May 24, 1927.  1,629,493

UNITED STATES PATENT OFFICE.

HENRY FORD, OF DEARBORN, MICHIGAN.

AUTOMOBILE BODY CONSTRUCTION.

Application filed August 18, 1926. Serial No. 129,973.

The object of my invention is to provide an automobile body structure of simple, durable, and inexpensive construction.

A further object of my invention is to provide a fuel tank as part of a body construction of an automotive vehicle in the cowl thereof which is so arranged that under normal conditions no leakage can occur which will permit the fuel to drip into either the engine or body portion of the vehicle.

Still a further object of my invention is to provide a fuel tank for an automobile body which is disposed under the cowl of the body and which is so constructed that the tank may form a part of the body or vice versa.

Still a further object of my invention is to combine the parts of a cowl fuel tank with the parts of the body in such a way as to eliminate a large part of the bracing ordinarily used in connection with such a construction and at the same time to minimize the danger of leakage.

Still a further object of my invention is to provide in combination with a cowl fuel tank a specially designed filler opening so that overflow from the filler opening due to splashing will be conducted away from the filler opening without coming in contact with the outer surface of the cowl.

With these and other objects in view, my invention consists in the arrangement, construction, and combination of the various parts of my improved device as described in the specification, claimed in the claims, and disclosed in the accompanying drawings, in which:

Figure (1) shows a side elevation of an automobile body construction involving my improved device.

Figure (2) shows a vertical, central, longitudinal sectional view of the parts of my improved body construction.

Figure (3) shows a vertical transverse sectional view taken on the line 3—3 of Figure (2).

Figure (4) shows an enlarged detail view in vertical central section to illustrate the construction of the filler opening and the overflow construction associated therewith.

Figure (5) illustrates in perspective the member forming the top of my improved fuel tank and the upper portion of the cowl of the body.

Figure (6) illustrates in perspective the member which forms the bottom and forward end of my improved fuel tank and a brace for the cowl assembly.

Figure (7) illustrates in perspective the right hand side member of the cowl, which also forms one of the supporting members for the gas tank.

Figure (8) illustrates in perspective the corresponding left hand cowl member and support, and Figure (9) shows a perspective view of the combined cowl and fuel tank support and floor board supporting member.

Referring to the accompanying drawings, I have used the reference numeral (10) to indicate the top member, which forms both the top member of the cowl in my improved body construction and also the top of the fuel tank. This member is generally of arcuate cross section and is designed to have its rear edge as at (11) disposed adjacent to the lower edge of the windshield, ordinarily provided in connection with an automotive vehicle, and to be correspondingly shaped for that purpose. The forward edge of this combined top member, as at (12), is formed with an integral channel which extends from one forward edge of the top member to the other.

In Figure (6) I have illustrated in perspective the second member of my improved combination, to which I have given generally the reference numeral (13). This member is designed to form the bottom of my fuel tank, the forward wall thereof, a brace for the cowl structure, and a portion of the dash of the vehicle. The portion of this second member (13) which forms the bottom of the tank has the reference numeral (14) applied thereto and is of arcuate section generally from front to rear of the vehicle body. At the forward end of this bottom (14) a portion (15) is turned up to substantially a vertical position to form the forward or front wall of the fuel tank and also a portion of the dash of the vehicle. The entire edge of the member (13) is flanged as at (16) to fit against the edge of the top member (10) so that due to the arcuate section of the major portion of these two members, namely, the top member (10) and the bottom member (13), a two piece fuel tank is formed, which also forms the top portion of the cowl of the body and the upper portion of the dash of the body.

In Figures (7) and (8) I have illustrated the right and left hand side members of the cowl and fuel tank supporting construction used in connection with my improved device. I have given the reference numeral (17) to the right hand member and (18) to the left hand member. The upper edge of each of these members is offset somewhat, as at (17A) so that the lower edge of the sides of the member (10) and the flanges (16) of the member (13) may rest adjacent to these offset portions whereby the joint between the various parts may be made invisible or substantially invisible in the completed cowl by the use of sandpaper and solder. The fifth member of my improved device consists of the combined floor board and tank cowl supporting member, illustrated in Figure (9) and to which I have given the general reference numeral (19). The forward vertical wall (20) of this member (19) is designed to complete the dash for the body in combination with the portion (15) of the member (13) and inclined portion (21) at the lower edge of the dash portion (19) forms the upper portion of the inclined floor at the forward end of the vehicle body. Rearwardly of the floor portion (21) are channel shaped strips (22) having laterally extending flanges (23) designed to form shoulders upon which the floor boards (24) may rest. This member (19) has a flange (25) around its edges by which it may be secured respectively to the cowl side members (17) and (18) and the tank bottom member (13). It will be noted that the cowl side members (17) and (18) are provided with channels (26) adjacent to the forward edges thereof which, when the device is assembled, form a continuation of the channel (12) in the top member. This continuous channel so formed at the forward edge of the cowl is disposed almost entirely under the hood (27) of the vehicle and is, therefore, substantially unnoticeable when the vehicle parts are in their normal position. This will be noted especially by referring to Figure (4).

The top member (10) is provided at about the center thereof by a circular opening, designed to receive the filler neck. This filler neck consists of an outer ring (28) having an inwardly extending annular flange (29) at the lower edge thereof, designed to rest against the surfaces surrounding the opening in the top member (10). A second ring (30) of smaller diameter than the ring (28) is provided with an inwardly offset shoulder (31) at the lower edge thereof, which is designed to extend through the opening in the top member and to have its lower edge flanged back outwardly at (32) to form a liquid tight joint between the top member, the flange (29) and the ring (30). A portion of the inner surface of the ring (30) is threaded to co-act with the corresponding threads of the tank cap. The cap consists of an annular ring (33) which is threaded at its outer surfaces to co-act with the threads on the ring (30) and an enlarged head portion (34). The lower part of this head portion (34) forms a shoulder at (35) of sufficient width to engage the upper edges of both the rings (28) and (30) when the cap is screwed to position to close the tank. The lower surface of this shoulder (35) is provided directly upon the space between the rings (28) and (30) with an annular groove (36). A diaphragm (37) extends across the bottom of the ring (33) and forms a substantially liquid tight connection therewith. Minute breathing openings (38) and (39) are provided in the diaphragm (37) and flange (35) respectively. A compressible gasket (40) is disposed beneath the flange (35) and groove (36) and rests on the upper edges of both the rings (28) and (30). This gasket (40) is provided with one or more minute breathing openings (41).

The space between the rings (28) and (30) form an overflow or waste channel, which is connected by an overflow tube (42) with the channel (12) in the top member (10). It will be noted that this tube (42) extends within the fuel tank.

In the form of cap which I have here illustrated, the parts which have heretofore been described, are preferably made of one piece sheet steel stamping, which is covered by an ornamental brace cap (43), which may be nickeled and knurled as desired.

In the practical operation of my improved device, the parts are preferably assembled by first welding the horizontal portion of the flange (25) of the floor board support to the lower surface of the tank bottom member (13), this operation being preferably performed with what is termed a line weld. The side members (17) and (18) may then be placed in position and the top member (10) properly placed so that a line weld may be run along the flange (16) to weld the top, bottom and side members of my improved device into the unitary fuel tank, dash and cowl structure. The remaining portions of the flange (25) may then be welded to the side members (17) and (18) to complete the structure and make it rigid. The order and method of welding or securing these parts together as described is merely used as a convenient illustrative method of assembly and I do not desire to limit myself to the particular steps or the order in which they are enumerated.

It will be noted that the filler neck construction will already be applied to the top member (10) in the manner heretofore described before the parts are finally welded together.

Among the many advantages resulting from the use of my improved device, it will be noted that, first, I have provided what may be termed a five-piece structure, which performs all the functions of a fuel tank, a dash, a cowl, a floor board support, and the braces or supporting members ordinarily incidental to these various parts. I have further been able to so construct the parts and to arrange their connections that it is substantially impossible for any leak at the seams of the fuel tank to permit fuel to run either into the body proper or into the engine compartment at the forward end of the vehicle. It will be noted that the rear upper edge of the tank has the only portion of the seam between the various parts from which the fuel could possibly leak into the vehicle body proper and that there are no seams which could permit the fuel leaking therethrough to pass into the engine compartment. Further I have provided channel portions (12) and (26) so that if the fuel tank should overflow then that the overflow would run down to this channel and follow the channel down to some point outside of either the engine compartment or the body. Seepage past the threads of the cap caused by a leakage through the breathing openings of the cap will merely pass into the channel between the rings (28) and (30) and then be drained off through the tube (42) into the channels (12 and (26).

Still a further advantage results from the use of this improved construction in that I am enabled to make the tank and cowl parts out of relatively heavier material than either of these parts have heretofore been made, thereby increasing their durability without increasing the weight of vehicle bodies as they are ordinarily made because my improved construction enables me to eliminate substantially all bracing.

Some changes may be made in the arrangement, construction, and combination of the various parts of my improved device without departing from the spirit of my invention, and it is my intention to cover by the following claims such changes as may respectively be included within the scope thereof.

I claim as my invention:

1. In a combined cowl and fuel tank construction a top member adapted to form a top member for a cowl and a fuel tank, a second member designed to form a combined bottom and end member for the fuel tank and a brace for the top member, a pair of side members adapted to form the sides of the cowl and to support the fuel tank, and means for securing the edges of said members together to thereby form a combined cowl, dash, and fuel tank construction.

2. In a combined cowl, dash, and fuel tank construction, a top member designed to form the top of the cowl and fuel tank, a second member designed to form the bottom and front wall of the fuel tank and a portion of the dash, side members designed to form the side members of the cowl and the support for the fuel tank, a member designed to complete the dash structure and to form a part of the floor of the body and to form a support for the floor boards of such body, and means for securing the edges of said members together to thereby form a combined dash, fuel tank, cowl and floor supporting structure.

3. In a combined cowl and fuel tank construction a member designed to form the top of the cowl and fuel tank, a second member designed to form the bottom of front wall of the fuel tank, said second member having a flange at the edge thereof designed to coincide with the edge of the first described member, and means for forming a liquid tight joint between the edges of said members to thereby form a combined fuel tank and cowl construction, the parts being so arranged that if the seam adjacent to the lower portion of the tank should spring a leak then that the fuel therefrom would run to a place outside the vehicle body.

Signed at the city of Dearborn, county of Wayne, State of Michigan, this 31st day of July 1926.

HENRY FORD.